US009969574B2

(12) United States Patent
Robert

(10) Patent No.: US 9,969,574 B2
(45) Date of Patent: May 15, 2018

(54) WHEELBARROW HAULING, DUMPING AND LEVELING DEVICE

(71) Applicant: Donald E. Robert, Jefferson, GA (US)

(72) Inventor: Donald E. Robert, Jefferson, GA (US)

( * ) Notice: Subject to any disclaimer, the term of this patent is extended or adjusted under 35 U.S.C. 154(b) by 0 days. days.

(21) Appl. No.: 15/264,537

(22) Filed: Sep. 13, 2016

(65) Prior Publication Data

US 2018/0072518 A1  Mar. 15, 2018

(51) Int. Cl.
*B65G 67/30* (2006.01)
*B62B 1/00* (2006.01)
*B62B 1/18* (2006.01)
*B62B 5/00* (2006.01)

(52) U.S. Cl.
CPC .............. *B65G 67/30* (2013.01); *B62B 1/008* (2013.01); *B62B 1/18* (2013.01); *B62B 5/0003* (2013.01)

(58) Field of Classification Search
CPC ........ B65G 67/30; B65G 67/32; B65G 67/34; B65G 67/42; B65G 65/23; B62B 5/0003; B62B 5/0079
USPC ........ 414/359, 360, 350, 332, 334, 419, 678
See application file for complete search history.

(56) References Cited

U.S. PATENT DOCUMENTS

| | | | | |
|---|---|---|---|---|
| 2,585,095 | A * | 2/1952 | Daniels | E02F 3/345 414/641 |
| 4,155,678 | A * | 5/1979 | Lehman | B60P 3/07 280/402 |
| 4,234,284 | A * | 11/1980 | Hauff | B60R 9/06 224/282 |
| 4,281,950 | A * | 8/1981 | Lehman | B60P 3/07 280/47.31 |
| 4,934,894 | A * | 6/1990 | White | A61G 3/0209 224/492 |
| 5,121,970 | A | 6/1992 | Andersen | |
| 5,509,723 | A * | 4/1996 | Bratlie | B65G 67/30 298/17 SG |
| 5,531,463 | A | 7/1996 | Givens | |
| 6,474,929 | B1 * | 11/2002 | Hartman | B65G 65/23 414/422 |
| 7,354,059 | B2 | 4/2008 | Black | |
| 7,472,917 | B2 | 1/2009 | Loudon | |
| 7,641,285 | B2 | 1/2010 | Jacobs | |

(Continued)

OTHER PUBLICATIONS

Titan Distributors, "Category 1 3-Pt 2" Receiver Hitch, Titan Attachments, downloaded from: https://www.palletforks.com/3-point-2-receiver-trailer-hitch-catagory-1.html?utm_source=bing &utm_medium=cpc&utm_campaign=PF%20-%20Product%20Listing%20Ads&utm_term=4580565441470515 &utm_content=Palletforks.com on Dec. 18, 2017, 1 page in pdf.

*Primary Examiner* — Mark C Hageman
(74) *Attorney, Agent, or Firm* — Mitch Harris, Atty at Law, LLC; Andrew M. Harris

(57) ABSTRACT

A wheelbarrow carrier provides transportation and dumping from a connection to a standard trailer hitch or tractor three-point mount. A pivoting ramp is used to load the wheelbarrow and a locking mechanism locks the wheelbarrow foot in place and the ramp in an upward position, once the wheelbarrow has been rolled onto the ramp and the ramp has pivoted from a downward position to an upward level position. The ramp pivots once the wheel of the wheelbarrow has rolled past the pivot point sufficiently to tip the ramp. Once the wheelbarrow is locked in the upward (level) position, a motor is activated to rotate a boom to which the ramp is attached with respect to a frame that is connected to the vehicle mount.

20 Claims, 15 Drawing Sheets

(56) References Cited

U.S. PATENT DOCUMENTS

| | | |
|---|---|---|
| 8,382,138 B2 | 2/2013 | Carroll et al. |
| 8,474,855 B2 | 7/2013 | Kilen |
| 9,033,641 B1 * | 5/2015 | Barefoot .................. B60P 3/06 414/462 |
| 9,067,610 B2 | 6/2015 | Lichtenberg |
| 9,108,690 B2 | 8/2015 | Rowlands |
| 9,120,499 B2 | 9/2015 | Michel, Jr. |
| 9,248,850 B1 | 2/2016 | Romas et al. |
| 9,327,747 B2 | 5/2016 | Jarvis |

* cited by examiner

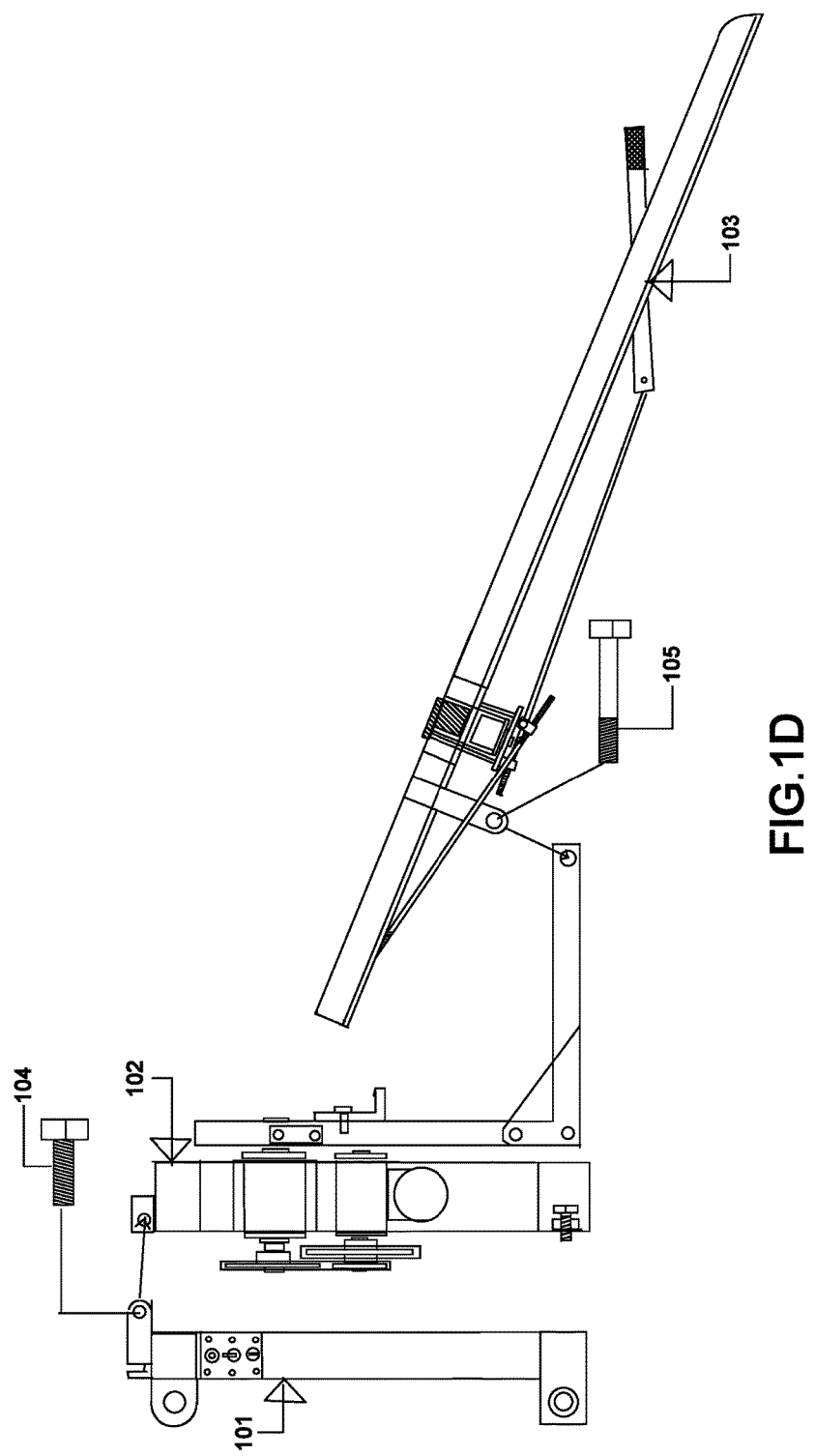

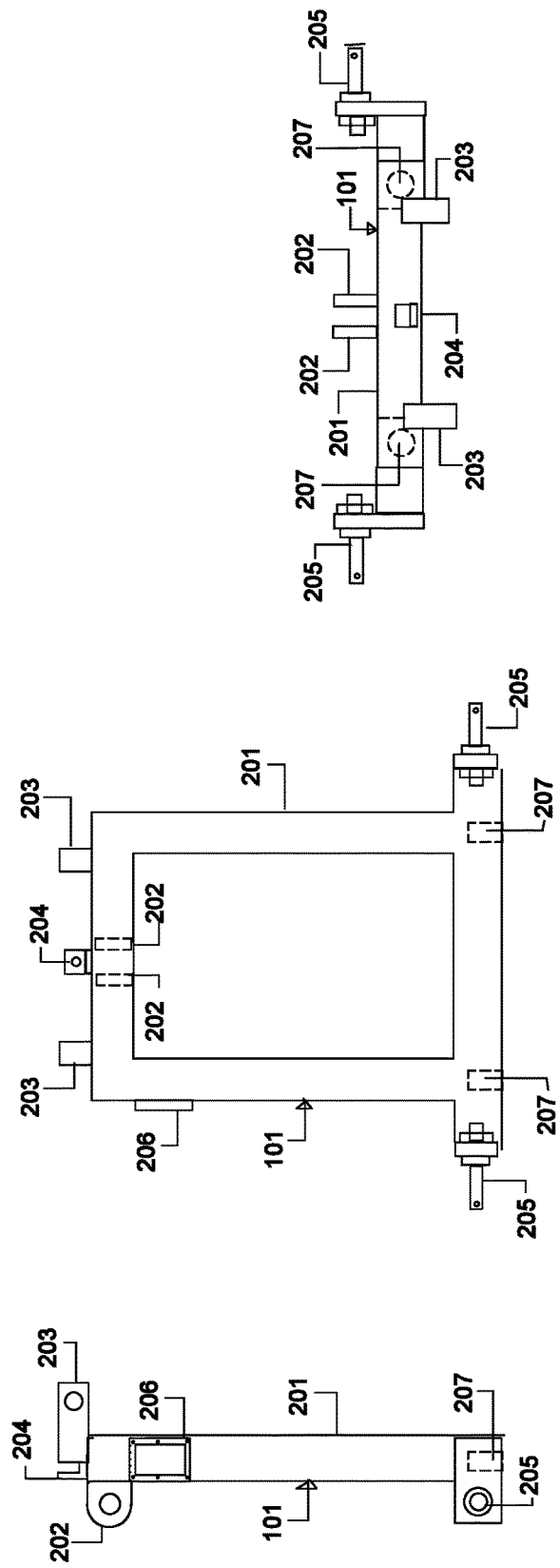

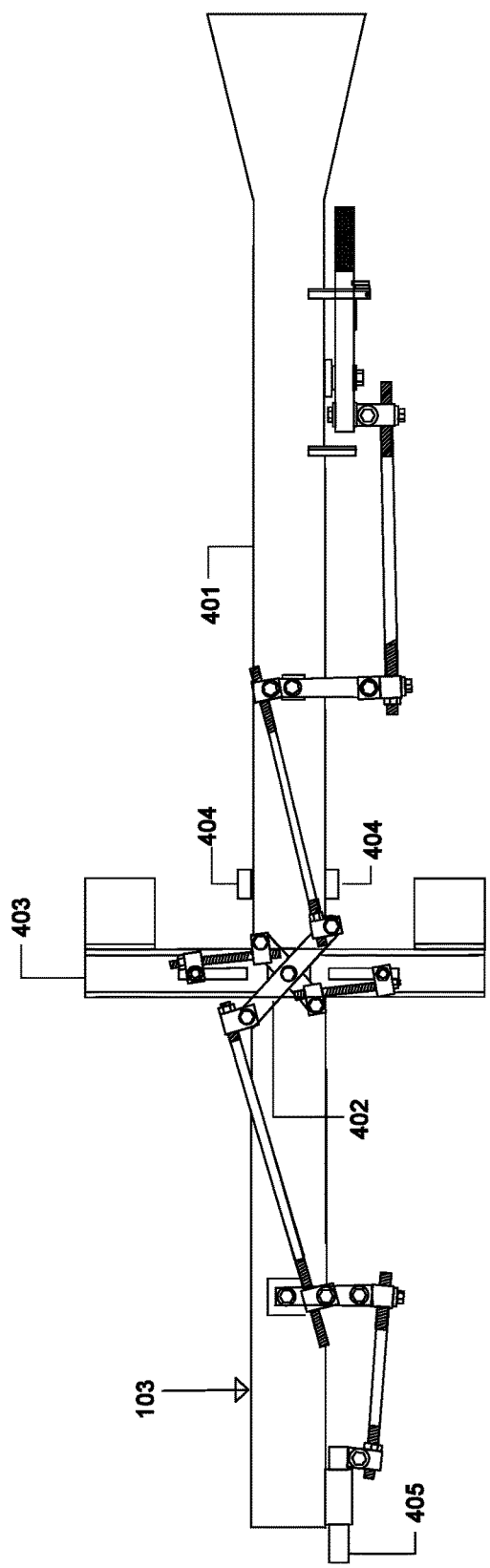

WHEELBARROW HAULING, DUMPING AND LEVELING DEVICE

BACKGROUND OF THE INVENTION

Field of the Invention

The present invention relates generally to equipment transports, and more particularly to a wheelbarrow carrier for hauling, leveling and dumping a wheelbarrow.

Wheelbarrows have been used throughout industry and commercial applications for generations and are present in its original design in front of every hardware store still today due to their versatility and affordability. Yet a conventional wheelbarrow has several significant drawbacks—the stress and strain applied to the back of the operator that occurs hauling over long distances or uneven terrain, unsteady, unreliable footing on a non-level surface such as a hill, and the difficulty dumping the transported material upon finally reaching the intended destination.

A variety of solutions exist to mitigate the widely known problems associated with wheelbarrow use. Devices exist for transporting wheelbarrows long distances, leveling them on uneven terrain and less labor intensive dumping. Many common solutions have been provided for a number of those problems that dispense with incorporation of the wheelbarrow altogether in favor of a replacement container or vehicle.

Other existing solutions are typically limited to providing separate individual resolutions to single specific problems. Some of the known solutions show mechanisms augmenting the wheelbarrow, but many of those require physical modifications to the conventional wheelbarrow for actual implementation. Further, most of the solutions taught cannot be applied to a single wheelbarrow in combination with other solutions, negating the possibility of a plurality of functions.

These major disadvantages present in the existing art result in an operator having to obtain, install and utilize multiple devices or changes in order to receive the benefits of more than one of the known solutions. The potential need for multiple wheelbarrows for different functions results in an additional expense together with troublesome operational and storage logistics for the operator.

As existing methods and devices fail to engineer a solution which executes multiple functions and which does not require physical changes to the conventional wheelbarrow, it is therefore perceived that a need remains for improved handling of a wheelbarrow.

SUMMARY OF THE INVENTION

The present invention provides a wheelbarrow carrier for executing a plurality of functions with a conventional wheelbarrow including transportation, dumping and leveling, with no required modification to the wheelbarrow. The wheelbarrow carrier includes a frame assembly for mounting to a vehicle, a pivoting boom arm that rotates around a first axis extending backward from the vehicle mount, and a ramp mounted to the boom arm. The ramp rotates around a pivot point in a second axis perpendicular to the first axis so that a wheelbarrow loaded onto the ramp can be dumped.

The foregoing and other objectives, features, and advantages of the invention will be apparent from the following, more particular, description of the preferred embodiment of the invention, as illustrated in the accompanying drawings.

DESCRIPTION OF VIEWS OF THE DRAWINGS

The novel features believed characteristic of the invention are set forth in the appended claims. The invention itself, however, as well as a preferred mode of use, further objectives, and advantages thereof, will best be understood by reference to the following detailed description of an illustrative embodiment when read in conjunction with the accompanying drawings, wherein like reference numerals indicate like components, and:

FIG. 1D is an exploded left side view of the example wheelbarrow carrier.

FIG. 2A is a left side view of an Assembly 1 (101) of the example wheelbarrow carrier.

FIG. 2B is a rear view of Assembly 1 (101) of the example wheelbarrow carrier.

FIG. 2C shows a top view of Assembly 1 (101) of the example wheelbarrow carrier

FIG. 4B is a bottom view of Assembly 3 (103) of the example wheelbarrow carrier with latches engaged.

DRAWING REFERENCE NUMERALS

Figure 1A:
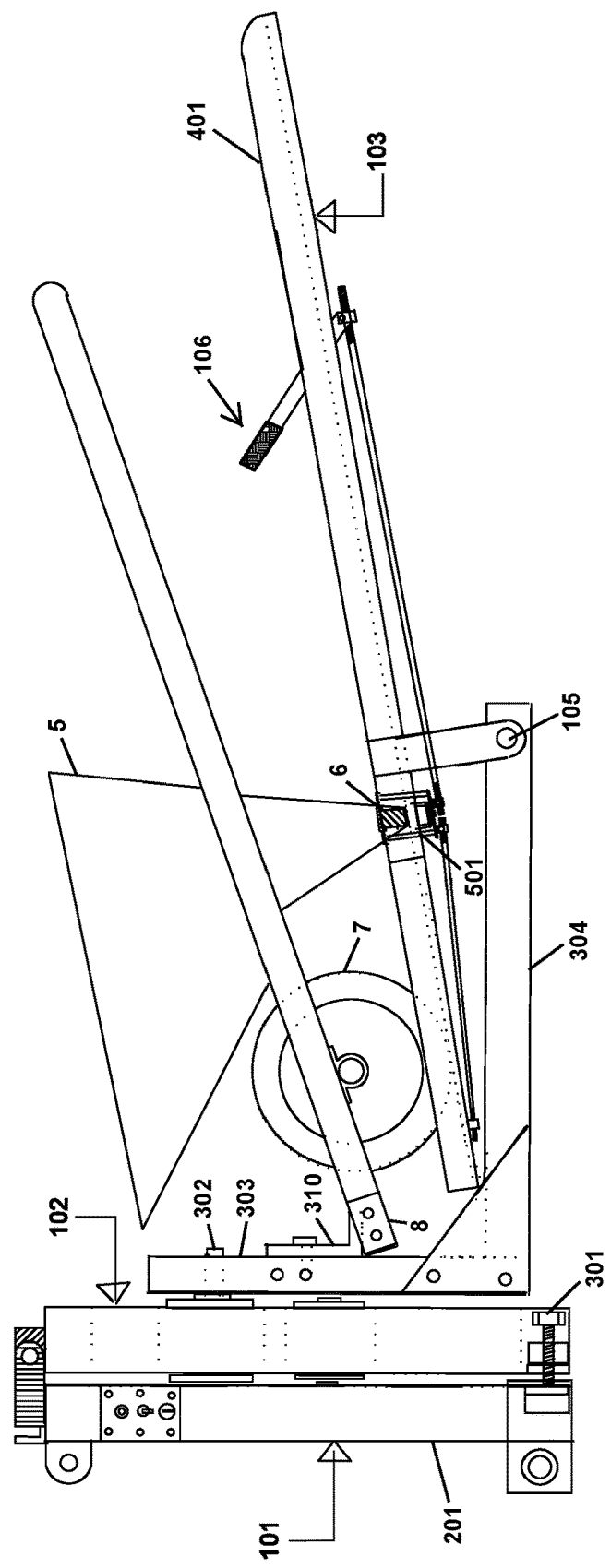
FIG. 1A is a left side view of an example wheelbarrow carrier with a conventional wheelbarrow mounted and locked.
Figure 1B:
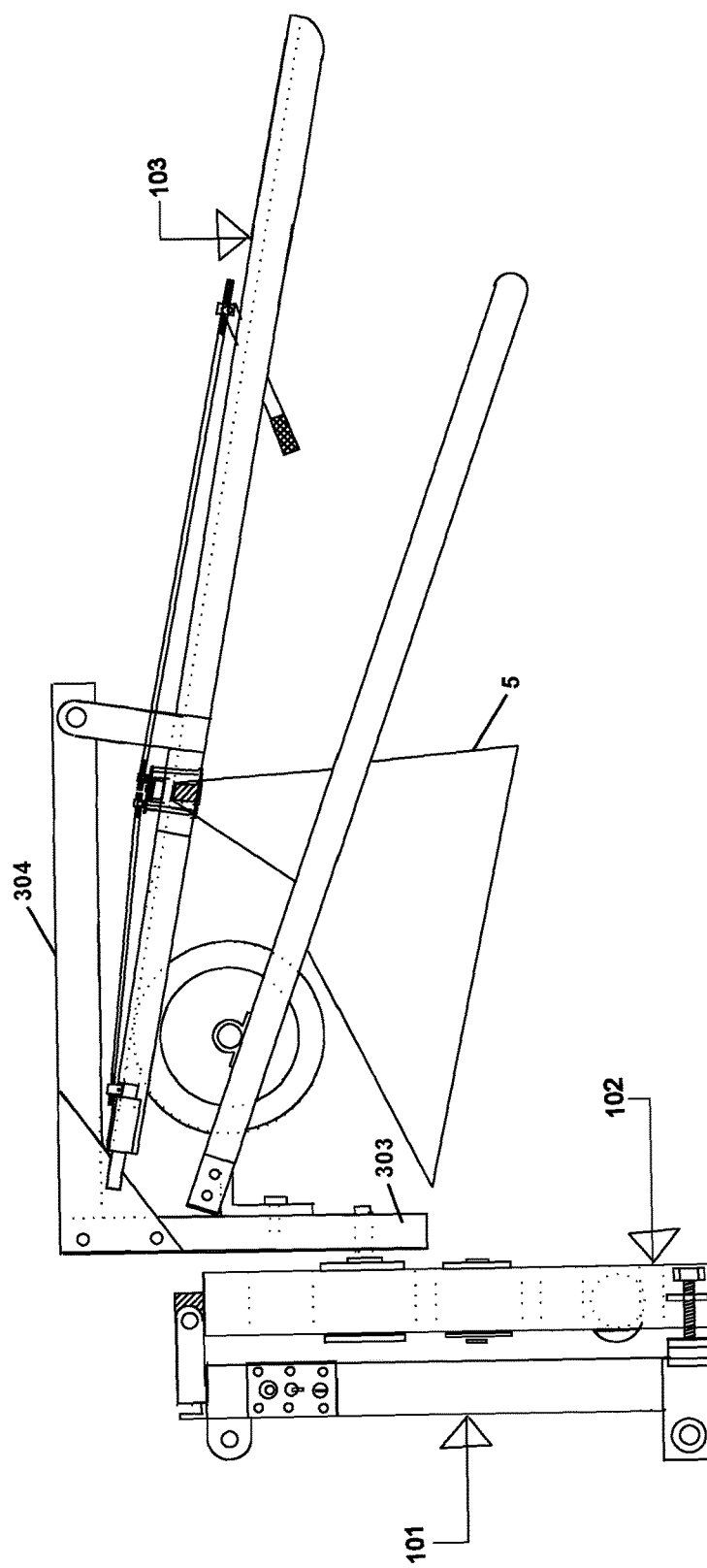
FIG. 1B is a left side view of the example wheelbarrow carrier with a crank arm and boom in a 180 degree rotated dumping position with the conventional wheelbarrow mounted and locked.
Figure 1C:
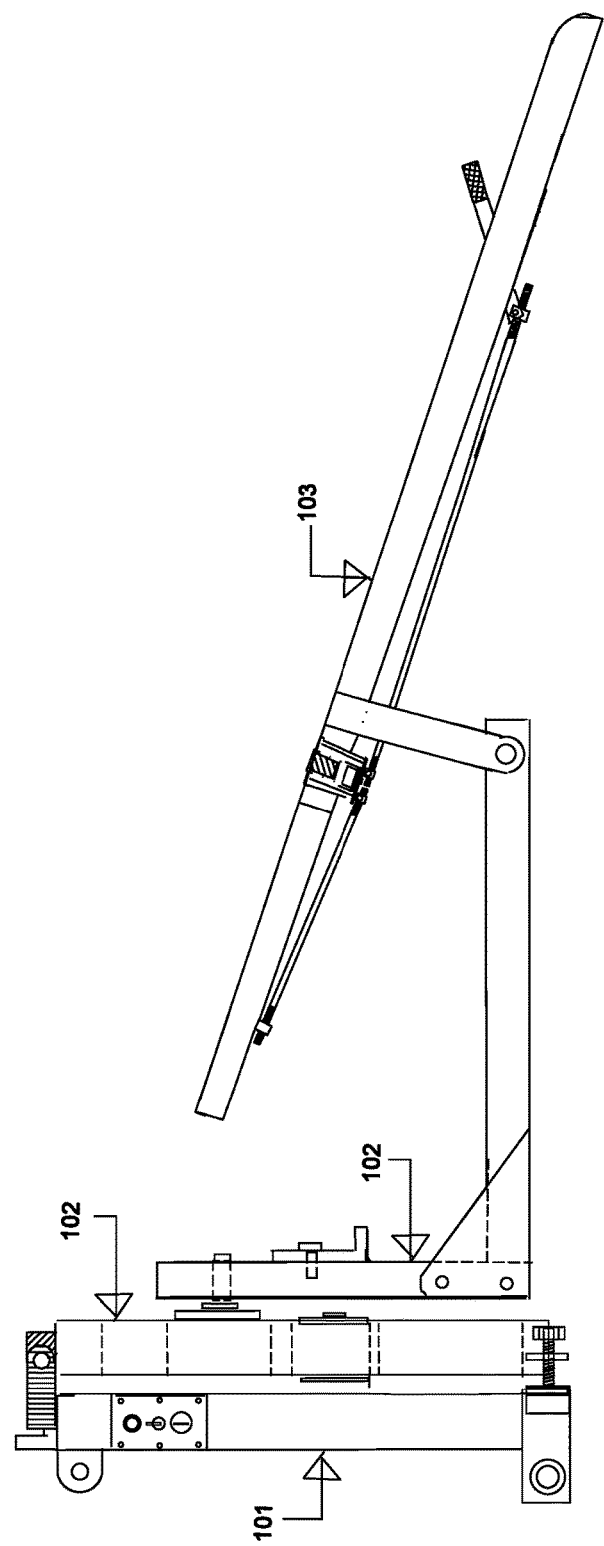
FIG. 1C is a left side view of the example wheelbarrow carrier with a ramp rotated to a downward position and with locks disengaged.

5 Wheelbarrow
6 Wheelbarrow foot
7 Wheelbarrow wheel
8 Wheelbarrow nose
101 Assembly 1—Tractor mounting assembly
102 Assembly 2—Rotational mechanism assembly
103 Assembly 3—Ramp and latching mechanism assembly
104 Safety pivot bolt
105 Ramp pivot bolt 106 Handle
201 Tractor mounting frame
202 Clevis tab
203 Safety pivot tab
204 Adapter stop
205 Three-point tractor hitch pin
206 Control panel ring
207 Adapter mounting hole
301 Rotational mechanism frame
302 Crank shaft
303 Crank arm
304 Boom
305 Jack shaft
306 DC gear motor
307 Tilt adjustment tab
308 Safety pivot point tab
309 Ramp pivot hole
310 Nose hold-down bracket
311 Left boom arm gusset
312 DC motor shaft
313 Crank shaft bushing
314 DC Motor mount
315 Jack shaft mount
401 Ramp
402 Latching control mechanism
403 Foot frame unit
404 Ramp pivot tab
405 Ramp latch
406 Connecting rods
408 Levers
501 Foot latch
701 Assembly 4—Vehicle receiver adapter assembly
702 Adapter frame
703 Adapter attachment point holes
704 Adapter attachment tabs
705 Adapter attachment point pins

DETAILED DESCRIPTION OF THE
ILLUSTRATED EMBODIMENT

All parts of the disclosed wheelbarrow carrier can assume various forms and are generally constructed of a structurally robust material (e.g., steel) and are attached by welding, nuts and bolts, or other suitable attachment.

Although the provided examples have been described with reference to specific embodiments, this description is not meant to be construed in a limited sense. Various modifications of the disclosed embodiments, as well as alternative embodiments of the invention will become apparent to persons skilled in the art upon reference to the description of the invention. It is therefore contemplated that the appended claims will include such modifications that fall within the scope of the invention.

Referring to the drawings in detail, where in like numerals designate like parts, a wheelbarrow transportation, leveling and dumping device in the form of a wheelbarrow carrier includes three major assemblies 101-103, as illustrated in FIGS. 1A, 1B, 1C and 1D. A wheelbarrow (5) is loaded onto a ramp (401), so that a wheel (7) of wheelbarrow (5) is past a pivot point representing an axis that rotates around a ramp pivot bolt (105) that secures ramp (401) to a boom (304) that supports ramp (401) and is rotationally coupled to a frame (301) of assembly (102) by a crank arm (303). Crank arm (303) is connected to frame (301) of second assembly (102) by a crankshaft (302) and provides another axis around which wheelbarrow (5) is rotated to dump wheelbarrow (5) as described below. A nose (8) of wheelbarrow (5) is fixed in place by a nose hold down bracket (310) as described in further detail below. A foot (6) of wheelbarrow (5) is captured by a foot latch (501) operated by a handle (106) as described in further detail below and ramp (401) is prevented from rotating around ramp pivot bolt (105) by a ramp latch (not shown) also operated by handle (106) as described in further detail below.

A safety pivot bolt (104) is used to join first assembly Assembly 1 (101) to second assembly Assembly 2 (102). As shown in FIG. 1D, ramp pivot bolt (105) joins Assembly 2 (102) to Assembly 3 (103).

Referring to FIGS. 2A-2C, assembly 1 (101) forms a rigid tractor mounting assembly including: a tractor mounting frame (201), clevis tabs (202) attached to the top center front of the frame (201), safety pivot tabs (203) attached to the top of frame (201), an adapter stop (204) attached at the top center of frame (201), three-point tractor hitch pins (205) attached to opposite sides of the bottom end of frame (201), a control panel ring (206) attached at the control panel site, and adapter mounting holes (207) cut into the bottom of frame (201).

Clevis tabs (202) and three-point tractor hitch pins (205) are used to mount the wheelbarrow carrier to a tractor. Adapter stop (204) is used to mount the wheelbarrow carrier to a standard trailer hitch receiver with an adapter described below. Safety pivot tabs (203) are used along with safety pivot bolt (104) to join Assembly 1 (101) to Assembly 2 (102). Control panel ring (206) is used to mount an electrical control panel as described below. Adapter mounting holes (207) are used to receive pins for an alternative mounting scheme described below.

Figure 3A:
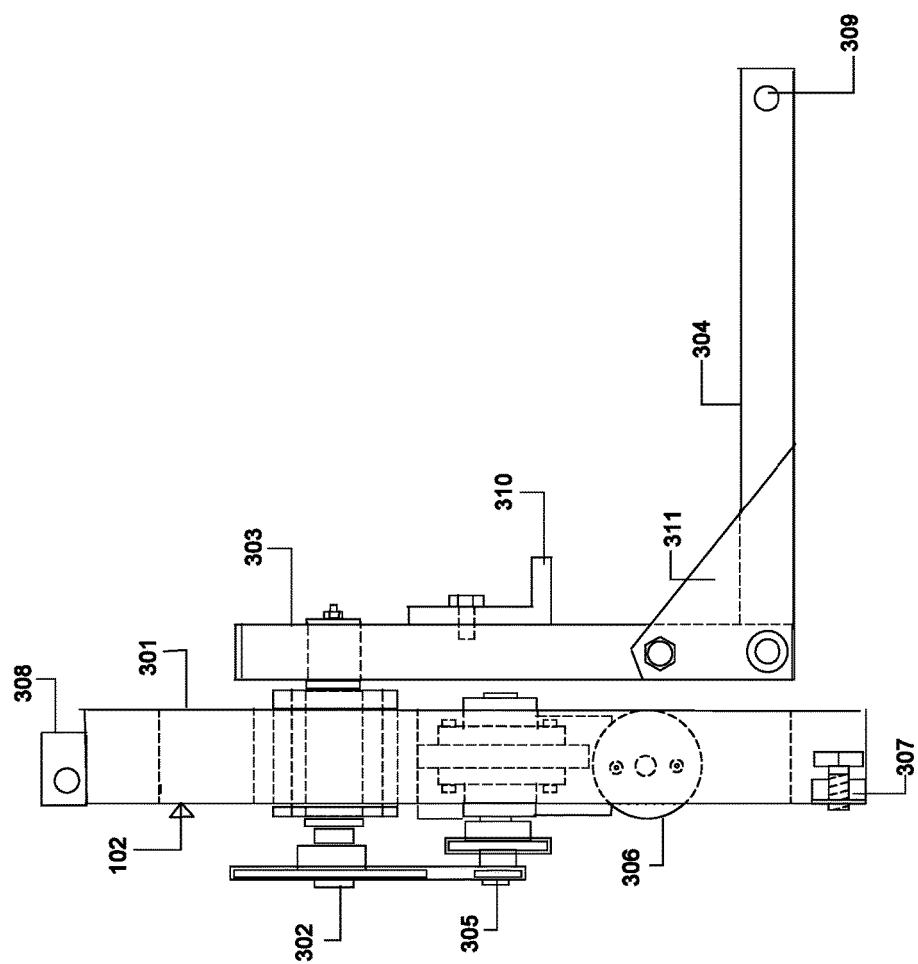
FIG. 3A is a left side view of an Assembly 2 (102) of the example wheelbarrow carrier with mechanical components installed.
Figure 3C:
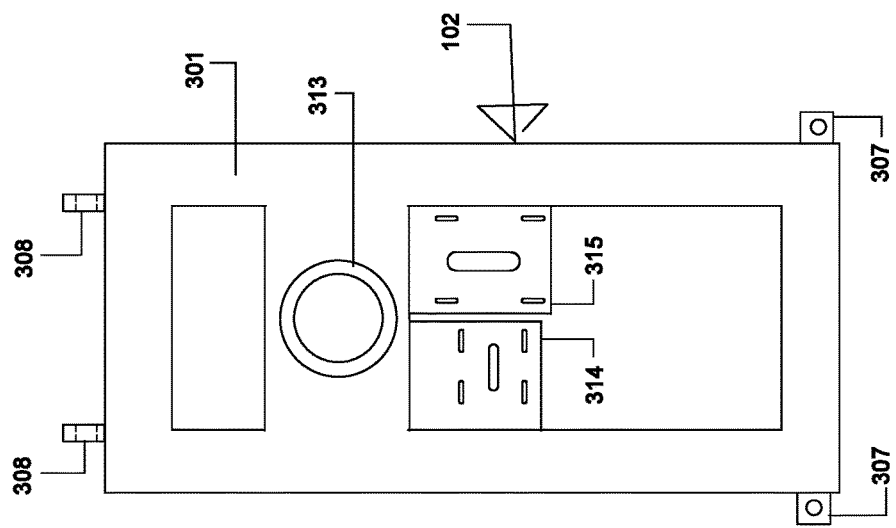
FIG. 3C is a front view of Assembly 2 (102) of the example wheelbarrow carrier with mechanical components uninstalled.
Figure 3B:
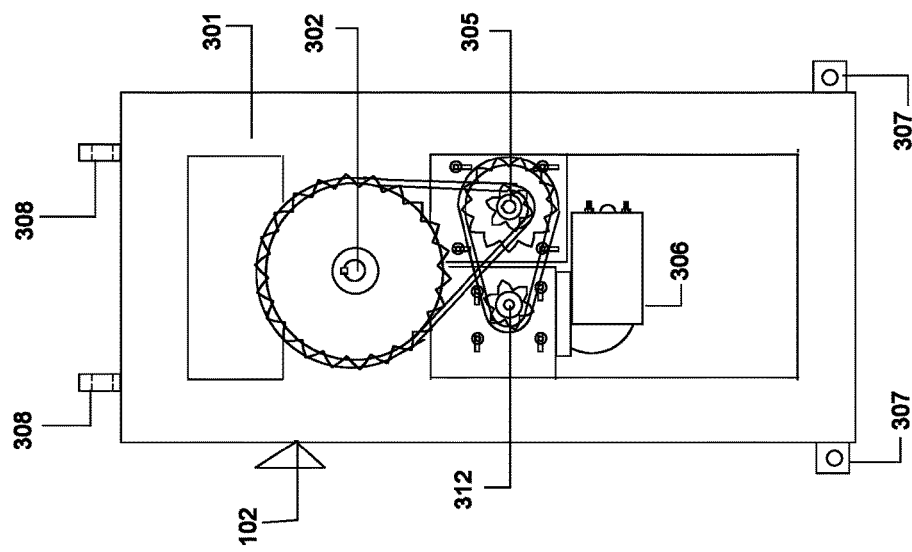
FIG. 3B is a front view of Assembly 2 (102) of the example wheelbarrow carrier with mechanical components installed.
Figure 4A:
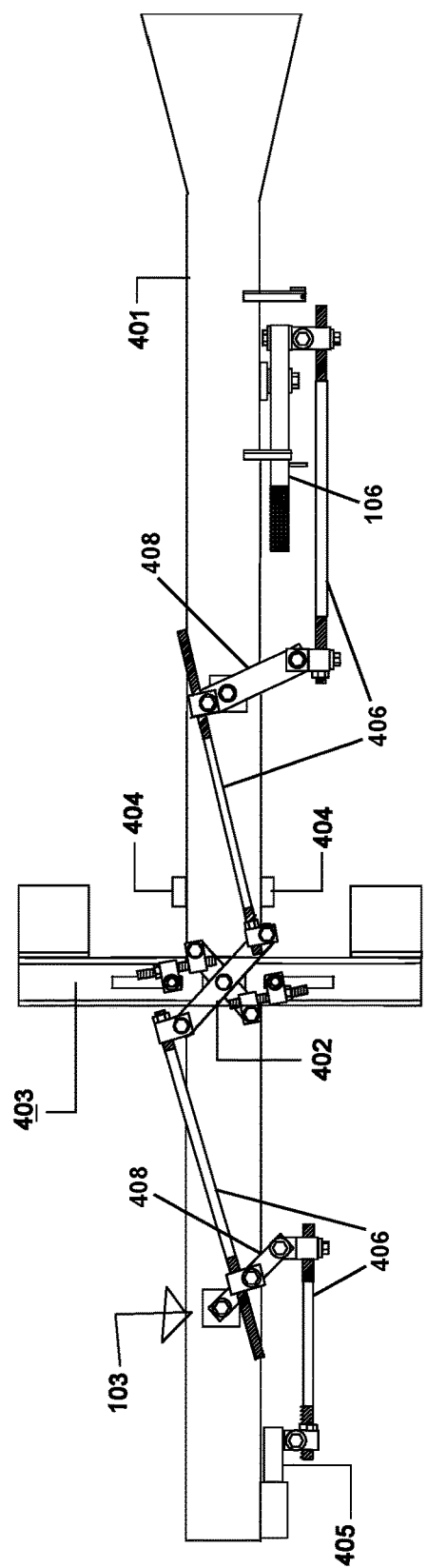
FIG. 4A is a bottom view of an Assembly 3 (103) of the example wheelbarrow carrier with latches disengaged.
Figure 5A:
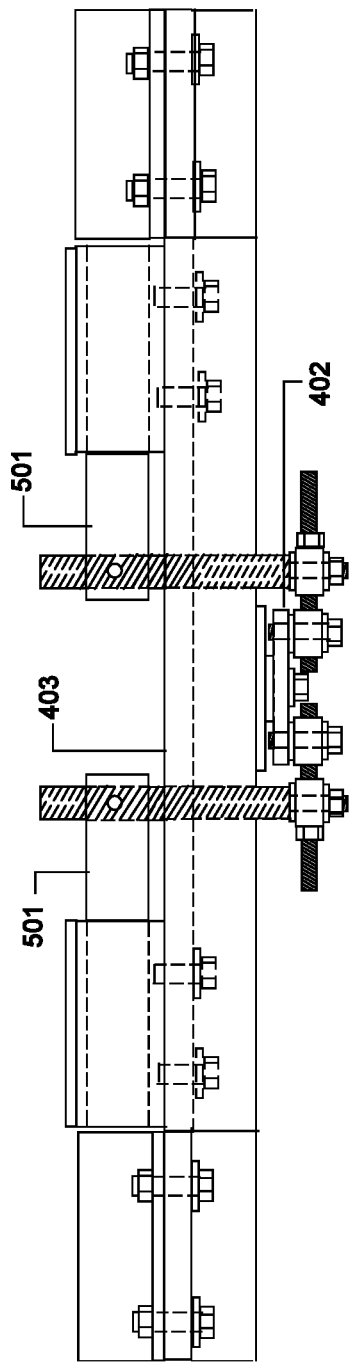
FIG. 5A is a rear view of Assembly 3 (103) and a foot frame unit (403) of the example wheelbarrow carrier.
Figure 5B:
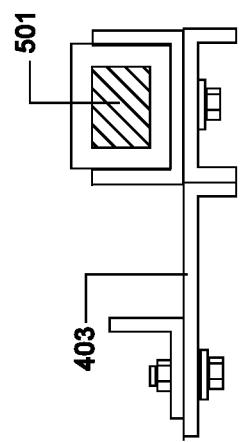
FIG. 5B is a right side view of Assembly 3 (103) and foot frame unit (403) of the example wheelbarrow carrier.

Referring to FIGS. 3A-3C, Assembly 2 (102) forms a rigid rotational mechanism assembly including a rotational mechanism (pivoting) frame (301), a crank shaft (302), a crank arm (303), a boom (304) attached to the end of crank arm (303), a jack shaft (305) mounted to an inner portion of frame (301), a DC motor (306) mounted to an inner portion of frame (301), tilt adjustment tabs (307) attached on the bottom end of frame (301), safety pivot point tabs (308) attached to the top of frame (301), a ramp pivot hole (309) at the end of the boom (304), a nose hold down bracket (310) attached to a rear end of crank arm (303), boom arm gussets (311) attached to crank arm (303) and boom (304), a DC motor shaft (312), a crank shaft bushing (313) mounted to an inside portion of frame (301), a DC motor mount (314) attached to an inside portion of frame (301), and a jack shaft mount (315) attached to an inside portion of frame (301).

Crank shaft (302) is used along with DC motor (306), DC motor shaft (312), sprockets and chain to drive crank arm (303) and boom (304) around at an appropriate rotational speed, and Assembly 2 (102) optionally includes jack shaft (305) as may be required to adjust the gearing ratio. Tilt adjustment tabs (307) are used to adjust the angle and spacing at which Assembly 2 (102) rests against Assembly 1 (101). The ramp pivot hole (309) is used along with the ramp pivot bolt (105) to join Assembly 2 (102) to Assembly 3 (103). Nose hold-down bracket (310) is included for stabilizing the nose of the wheelbarrow (5) in the locked position. Boom arm gussets (311) attach boom (304) to the crank arm (303). DC motor mount (314) is included to attach DC motor (306) to frame (301). Jack shaft mount (315) attaches jack shaft (305) to frame (301) if needed.

Referring to FIGS. 4A-4B and FIGS. 5A-5B, Assembly 3 (103) forms a ramp and a latching mechanism assembly including: a self-pivoting ramp (401), a latching control mechanism (402) mounted on the bottom of ramp (401), a foot frame unit (403) attached to ramp (401), ramp pivot tabs (404) attached to ramp (401) on either side, a ramp latch (405) mounted to the front of ramp (401), and foot latches (501) mounted on top of foot frame unit (403).

Ramp (401) is wide enough to accommodate most conventional wheelbarrow wheels, and is of a suitable length having a flared end for easy loading of wheelbarrow (5). Latching control mechanism (402) is a rotating link that operates in conjunction with foot frame unit (403), ramp latch (405), foot latches (501), levers (408), connecting rods (406) and handle (106) that pivots with respect to ramp (401) to lock wheelbarrow (5) to ramp (401) for travel with a single motion. Ramp pivot tabs (404) join Assembly 3 (103) to Assembly 2 (102).

Figure 6:
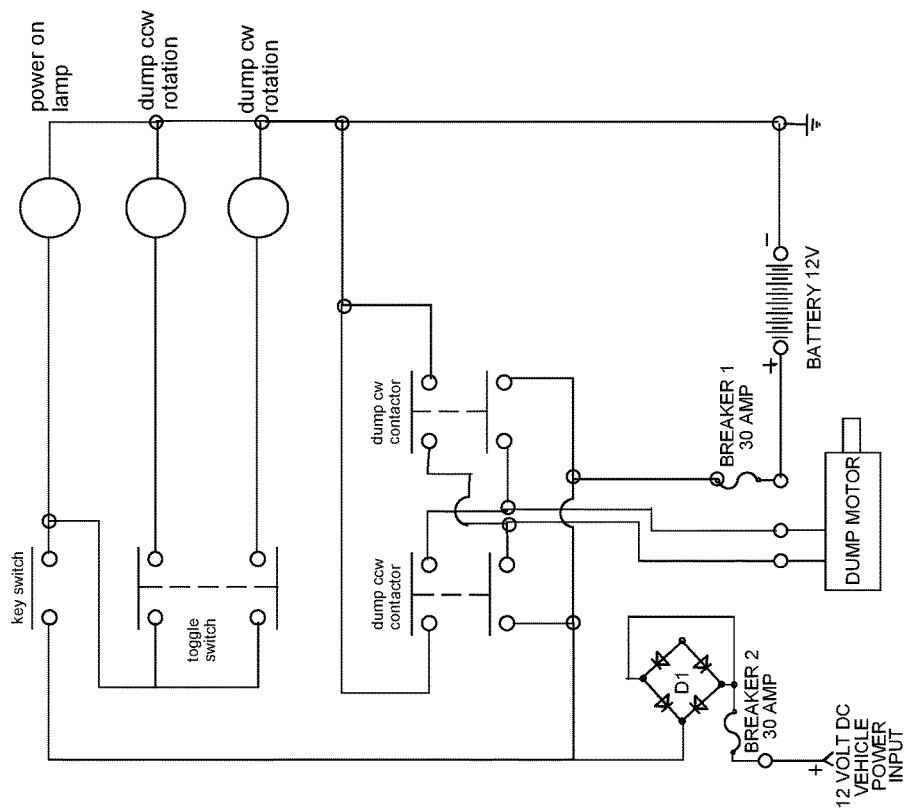
FIG. 6 is an electrical schematic of the example wheelbarrow carrier.

Referring to FIG. 6, the electrical wiring of Assemblies 1 (101) and 2 (102) is shown and operates to effect rotational functions of Assembly 3 (103).

Figure 8:
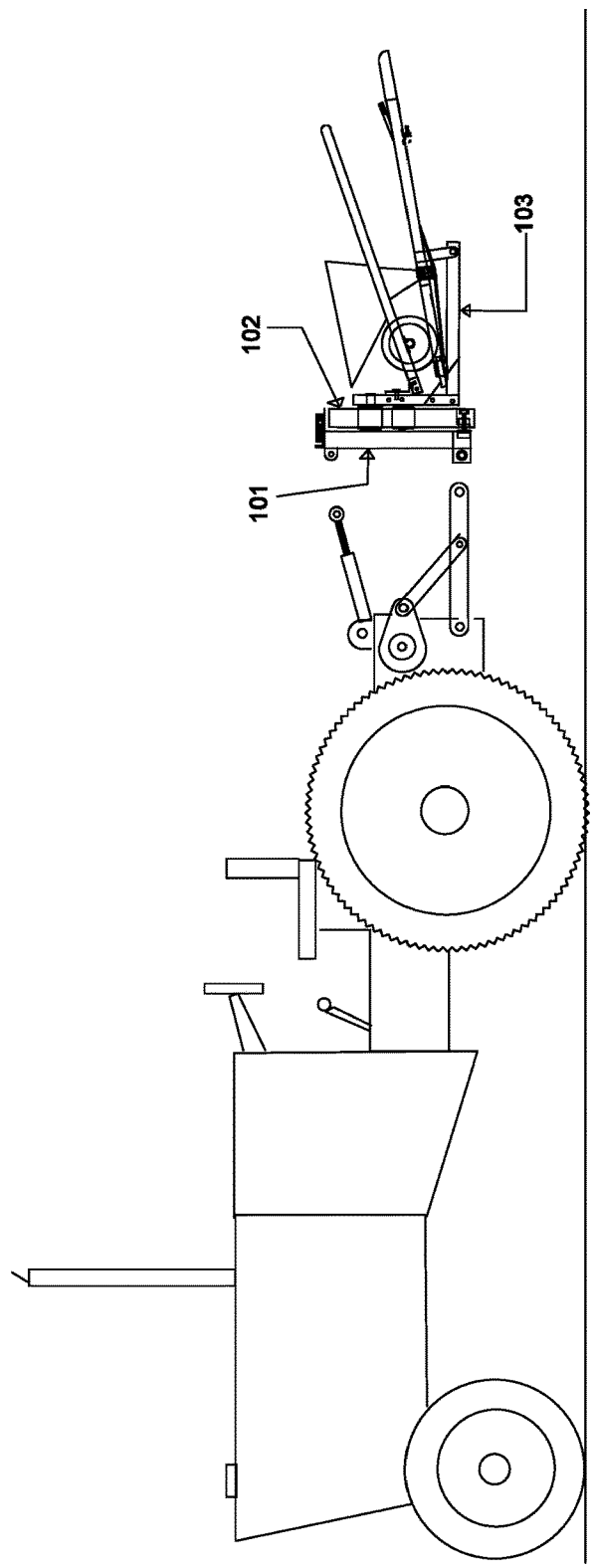
FIG. 8 is a left side view of Assemblies 1-3 (101-103) of the example wheelbarrow carrier in place to attach to a tractor.

To operate the example wheelbarrow carrier the following steps are performed: Mount the wheelbarrow carrier onto a tractor using clevis tabs (202) and three-point tractor hitch pins (205) as shown in FIG. 8. Load wheelbarrow (5) onto ramp (401) by rolling the wheelbarrow (5) into the illustrated position as ramp (401) self-pivots for locking when the weight of the wheel of wheelbarrow (5) moves past the pivot point at ramp pivot bolt (105) and ramp (401) tilts to an upward position. The locking mechanism handle (6) is then pulled to secure wheelbarrow (5) to ramp (401) for transport.

Figure 7B:
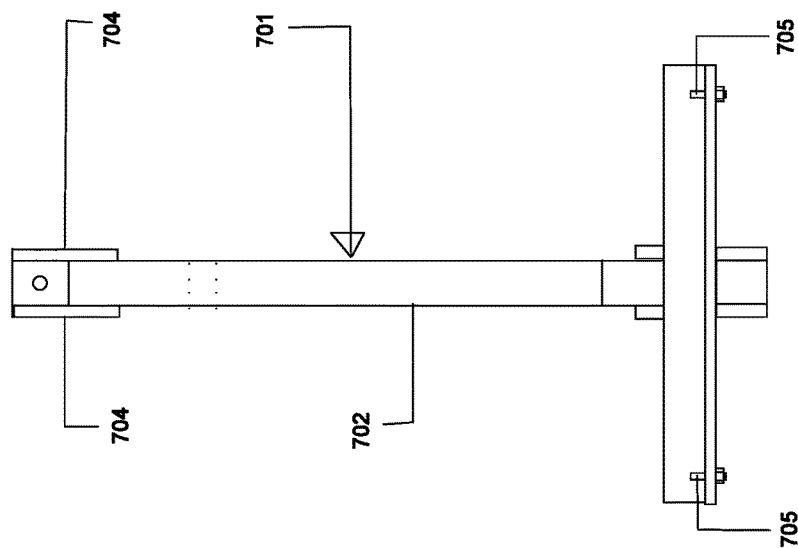
FIG. 7B is a rear view of Assembly 4 (701) receiver adapter in accordance with another example.
Figure 7A:
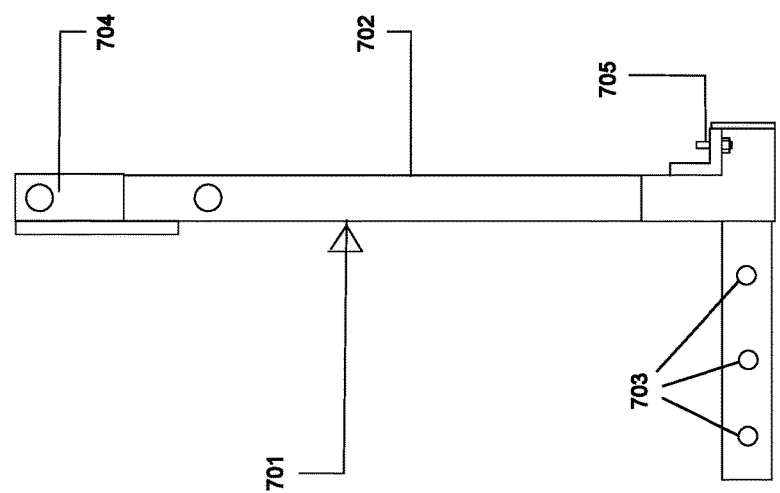
FIG. 7A is a left side view of an Assembly 4 (701) receiver adapter in accordance with another example.

Referring now to FIGS. 7A-7B, an assembly Assembly 4, which is vehicle receiver adapter assembly (701) and provides another example of a transportation vehicle mounting mechanism including: an adapter frame (702), adapter attachment point holes (703), adapter attachment tabs (704) attached to the top of adapter frame (702) and adapter attachment point pins (705) attached at the bottom of adapter frame (702).

Adapter frame (702) is used in conjunction with completed Assemblies 1-3 (101-103) described above. Adapter attachment point holes (703) join Assembly 4 (701) to a standard vehicle receiver hitch. The adapter attachment tabs (704) and adapter attachment point pins (705) join Assembly 1 (101) to Assembly 4 (701).

Figure 9:
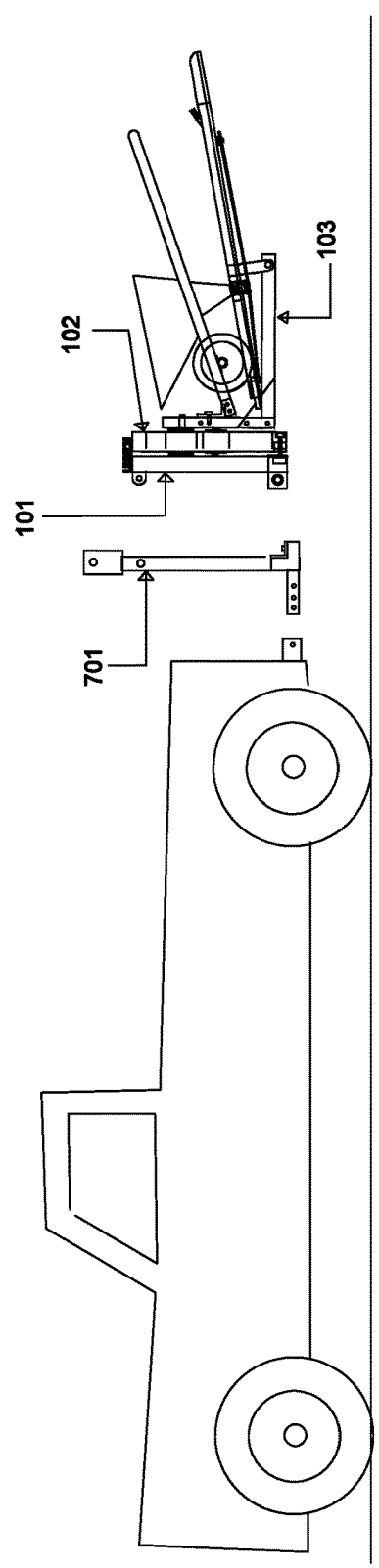
FIG. 9 is a left side view of Assemblies 1-3 (101-103 and adapter assembly 701) in place for attachment to a truck.
Figure 10:
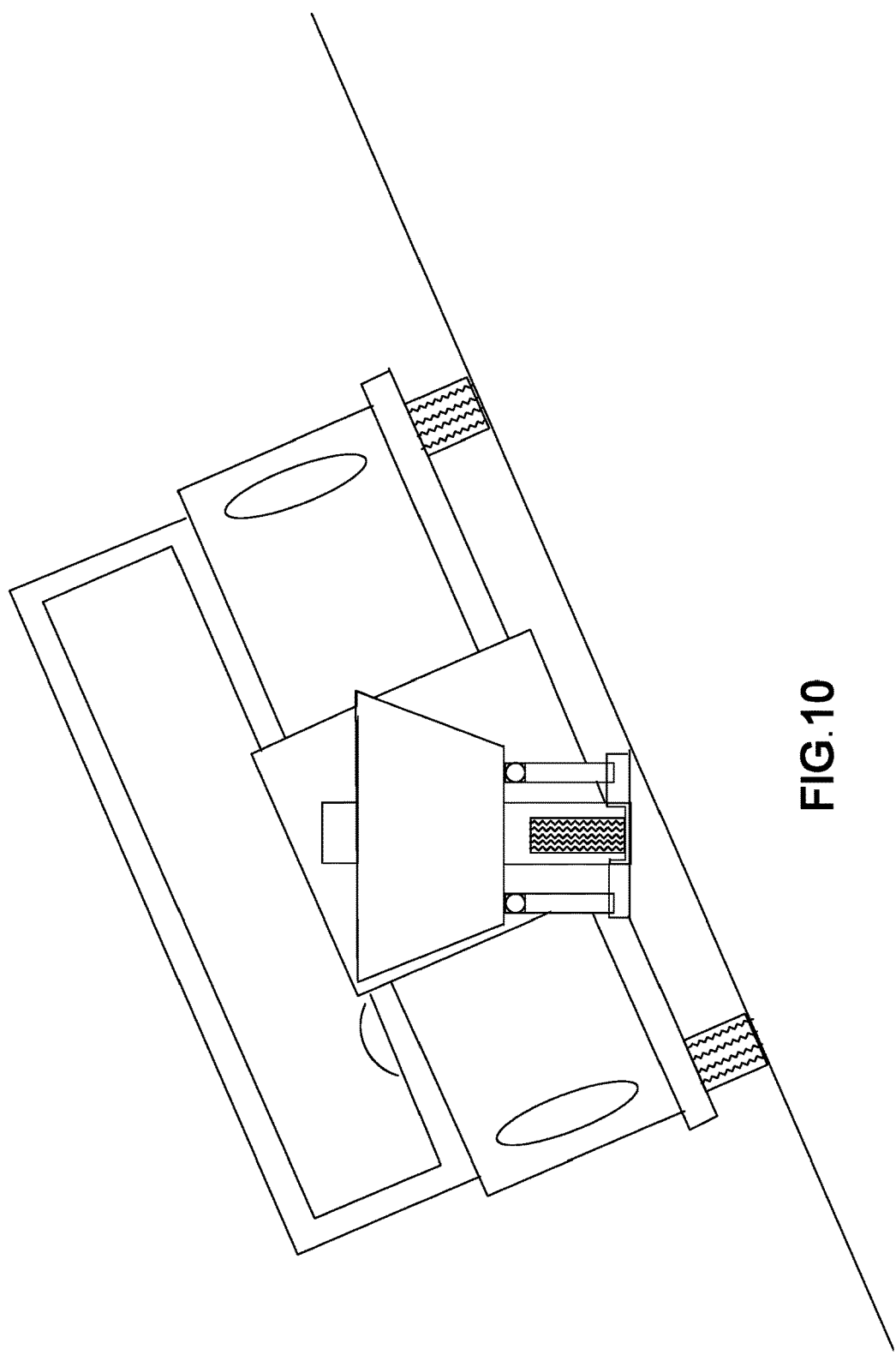
FIG. 10 is a rear view of Assemblies 1-3 (101-103 and adapter assembly 701) attached to a truck parked at an angle on a hill.

As illustrated in FIG. 9, to mount the invention to a vehicle other than a tractor, insert the front of the Assembly 4 (701) vehicle adapter into a standard vehicle receiver hitch, aligning the adapter attachment point holes (703) and securing with a pin. Then, attach all three joined assemblies to the rear of Assembly 4 (701) by placing adapter mounting holes (207) onto adapter attachment point pins (705), and resting clevis tabs (202) between adapter attachment tabs (704) and against adapter stop (204) while lining up holes and securing with a pin. Then, load wheelbarrow (5) onto ramp (401) by rolling into position as ramp (401) self-pivots for locking. Use the locking mechanism handle to secure wheelbarrow (5) to ramp (401) for transport. Operate an electrical switch to activate rotation of the wheelbarrow carrier to achieve dumping and leveling of the wheelbarrow as shown in FIG. 10.

While the invention has been particularly shown and described with reference to the preferred embodiment thereof, it will be understood by those skilled in the art that the foregoing and other changes in form, and details may be made therein without departing from the spirit and scope of the invention.

I claim:

1. A wheelbarrow carrier for receiving and dumping a wheelbarrow, the wheelbarrow carrier comprising:

a first frame assembly having a mount for attachment to a back of a transportation vehicle;

a boom rotationally coupled to a back side of the first frame assembly by a crank arm, wherein the boom is rotatable along a first axis extending backward from the mount; and a ramp rotationally coupled to the boom, wherein the ramp extends backward from the mount and is rotatable along a second axis perpendicular to the first axis, so that the ramp extends backward from the back of the transportation vehicle while the first frame assembly is attached to the transportation vehicle, and wherein the ramp is rotatable to a downward position when rolling the wheelbarrow onto the ramp and further rotatable to an upward position to secure the wheelbarrow on the ramp, and wherein the crank arm is rotatable to rotate the boom to permit dumping of the wheelbarrow while the wheelbarrow is secured on the ramp and while the ramp is in the upward position.

2. The wheelbarrow carrier of claim 1, wherein the ramp extends forward from a pivot that couples the ramp to the boom so that the ramp rotates along the second axis as a weight on a front wheel of the wheelbarrow is moved past the pivot, whereby the ramp automatically rotates to the upward position as the wheelbarrow is moved onto the ramp.

3. The wheelbarrow carrier of claim 2, further comprising a latching mechanism to secure the wheelbarrow on the ramp while the wheelbarrow is rotated to the upward position.

4. The wheelbarrow carrier of claim 3, wherein the latching mechanism comprises:

a handle mounted to the ramp proximate a rear end of the ramp;

a ramp latch for securing the ramp in the upward position;

a foot latch for securing a foot of the wheelbarrow when the wheelbarrow is loaded on the ramp and the latching mechanism is activated; and a plurality of connecting rods coupled between the handle, the ramp latch and the foot latch, wherein when the handle is moved to activate the latching mechanism, the ramp latch secures the ramp in the upward position and the foot latch secures the foot of the wheelbarrow to the ramp.

5. The wheelbarrow carrier of claim 4, wherein the latching mechanism further comprises:

a rotating link for moving the foot latch between a latched and an unlatched position; and a pair of rotating levers rigidly coupled by the plurality of connecting rods to the handle, the rotating link and the ramp latch, whereby movement of the handle rotates the rotating link and slides the ramp latch.

6. The wheelbarrow carrier of claim 1, wherein the first frame assembly includes a pair of clevis tabs at a top of a front side thereof and a pair of three-point hitch pins provided at a bottom of a pair of side supports of the first frame assembly, whereby the wheelbarrow carrier is mountable to a standard three-point tractor mounting location.

7. The wheelbarrow carrier of claim 6, further comprising an adapter for coupling the first frame assembly to a standard hitch receiver of the transportation vehicle, wherein the first frame assembly further includes adapter mounting holes for connecting a bottom support of the adapter to a bottom support of the first frame assembly and wherein the adapter includes a vertical support extending from the bottom support of the adapter and that includes a hole extending laterally through the vertical support for accepting a clevis pin inserted through the pair of clevis tabs of the first frame assembly.

8. The wheelbarrow carrier of claim 1, further comprising:
   an electric motor; and
   a drive mechanism coupled to the electric motor and further coupled to the first frame assembly and the crank arm for rotating the boom with respect to the first frame assembly around the first axis.

9. The wheelbarrow carrier of claim 8, wherein the electric motor is mounted to the first frame assembly, wherein the drive mechanism includes a crank shaft operated by the electric motor, and wherein the crank arm is secured to the first frame assembly by the crankshaft.

10. The wheelbarrow carrier of claim 1, wherein the ramp has a flared end that widens the ramp at a back end thereof to facilitate loading of the wheelbarrow onto the ramp.

11. A wheelbarrow carrier for receiving and dumping a wheelbarrow, the wheelbarrow carrier comprising:
   a first frame assembly having a mount for attachment to a back of a transportation vehicle;
   a boom rotationally coupled to a back side of the first frame assembly by a crank arm, wherein the boom is rotatable along a first axis extending backward from the mount;
   a ramp rotationally coupled to the boom, wherein the ramp extends backward from the mount and is rotatable along a second axis perpendicular to the first axis, so that the ramp extends backward from the back of the transportation vehicle while the first frame assembly is attached to the transportation vehicle, and wherein the ramp is rotatable to a downward position when rolling the wheelbarrow onto the ramp and further rotatable to an upward position to secure the wheelbarrow on the ramp, and wherein the crank arm is rotatable to rotate the boom to permit dumping of the wheelbarrow while the wheelbarrow is secured on the ramp and while the ramp is in the upward position, wherein the ramp extends forward from a pivot that couples the ramp to the boom so that the ramp rotates along the second axis as a weight on a front wheel of the wheelbarrow is moved past the pivot, whereby the ramp automatically rotates to the upward position as the wheelbarrow is moved onto the ramp, wherein the ramp has a flared end that widens the ramp at a back end thereof to facilitate loading of the wheelbarrow onto the ramp; and
   a latching mechanism to secure the wheelbarrow on the ramp while the wheelbarrow is rotated to the upward position, the latching mechanism comprising a handle mounted to the ramp proximate a rear end of the ramp, a ramp latch for securing the ramp in the upward position, a foot latch for securing a foot of the wheelbarrow when the wheelbarrow is loaded on the ramp and the latching mechanism is activated, and a plurality of connecting rods coupled between the handle, the ramp latch and the foot latch, wherein when the handle is moved to activate the latching mechanism, the ramp latch secures the ramp in the upward position and the foot latch secures the foot of the wheelbarrow to the ramp, wherein the latching mechanism further comprises a rotating link for moving the foot latch between a latched and an unlatched position, and a pair of rotating levers rigidly coupled by the plurality of connecting rods to the handle, the rotating link and the ramp latch, whereby movement of the handle rotates the rotating link and slides the ramp latch.

12. A method of handling a wheelbarrow, the method comprising:
   attaching a first frame assembly to a back of a transportation vehicle with a mount;
   loading the wheelbarrow by rolling the wheelbarrow onto a ramp rotationally coupled to a boom rotationally coupled to a back side of the first frame assembly and that rotates around a first axis extending backward from the mount, wherein the ramp extends backward from the mount and is rotatable along a second axis perpendicular to the first axis, so that the ramp extends backward from the back of the transportation vehicle while the first frame assembly is attached to the transportation vehicle, and wherein the ramp is rotatable to a downward position when rolling the wheelbarrow onto the ramp;
   first rotating the ramp to an upward position to secure the wheelbarrow on the ramp to complete the loading; and
   dumping contents of the wheelbarrow while the wheelbarrow is secured on the ramp and while the ramp is in the upward position by second rotating the crank arm to rotate boom around the first axis.

13. The method of claim 12, wherein the ramp extends forward from a pivot that couples the ramp to boom so that the first rotating the ramp to an upward position is caused by a weight on a front wheel of the wheelbarrow moving past the pivot, whereby the ramp automatically rotates to the upward position as the wheelbarrow is moved onto the ramp.

14. The method of claim 13, further comprising further securing the wheelbarrow on the ramp while the wheelbarrow is rotated to the upward position by operating a latching mechanism that secures the wheelbarrow on the ramp.

15. The method of claim 14, wherein the operating the latching mechanism comprises:
   pulling a handle mounted to the ramp proximate a rear end of the ramp;
   responsive to the pulling of the handle, securing the ramp in the upward position with a ramp latch coupled to the handle;
   further responsive to the pulling of the handle, securing a foot of the wheelbarrow with a foot latch coupled to the handle; and
   transferring motion from the handle to the ramp latch and the foot latch with a plurality of connecting rods coupled between the handle, the ramp latch and the foot latch, wherein when the handle is pulsed to activate the latching mechanism, the ramp latch secures the ramp in the upward position and the foot latch secures the foot of the wheelbarrow to the ramp.

16. The method of claim 12, wherein the first frame assembly includes a pair of clevis tabs at a top of a front side thereof and a pair of three-point hitch pins provided at a bottom of a pair of side supports of the first frame assembly, and wherein the method further comprises mounting the first frame assembly to a standard three-point tractor mounting location of a tractor.

17. The method of claim 12, wherein the first frame assembly includes a pair of clevis tabs at a top of a front side thereof and a pair of three-point hitch pins provided at a bottom of a pair of side supports of the first frame assembly, and wherein the method further comprises attaching an adapter between the first frame assembly and a standard hitch receiver of the transportation vehicle, wherein the first frame assembly further includes adapter mounting holes for connecting a bottom support of the adapter to a bottom support of the first frame assembly to the adapter and wherein the adapter includes a vertical support extending from the bottom support of the adapter and that includes a hole extending laterally through the vertical support for accepting a clevis pin inserted through the pair of clevis tabs of the first frame assembly.

18. The method of claim 12, wherein the dumping further comprises activating an electric motor, and wherein the second rotating the crank arm is performed with a drive mechanism coupled to the electric motor and further coupled to the first frame assembly and the crank arm.

19. The method of claim 18, further comprising mounting the crank arm to the first frame assembly with a crank shaft operated by the electric motor, wherein the second rotating is performed by rotating the crank shaft by activating the electric motor.

20. The method of claim 12, wherein the ramp has a flared end that widens the ramp at a back end thereof to facilitate loading of the wheelbarrow onto the ramp, and wherein the rolling the wheelbarrow onto the ramp is performed by guiding the wheel of the wheelbarrow into the flared end of the ramp.

\* \* \* \* \*